J. R. PENDELL.
WASH-BOILER.

No. 173,663.  Patented Feb. 15, 1876.

WITNESSES
Mary F. Utley.
E. H. Bates.

INVENTOR.
Jno. R. Pendell.
Chipman Hosmer & Co.
ATTORNEYS.

UNITED STATES PATENT OFFICE.

JOHN R. PENDELL, OF ONTARIO, NEW YORK.

IMPROVEMENT IN WASH-BOILERS.

Specification forming part of Letters Patent No. 173,663, dated February 15, 1876; application filed November 13, 1875.

*To all whom it may concern:*

Be it known that I, JOHN R. PENDELL, of Ontario, in the county of Wayne and State of New York, have invented a new and valuable Improvement in Wash-Boilers; and I do hereby declare that the following is a full, clear, and exact description of the construction and operation of the same, reference being had to the annexed drawings, making a part of this specification, and to the letters and figures of reference marked thereon.

Figure 1:
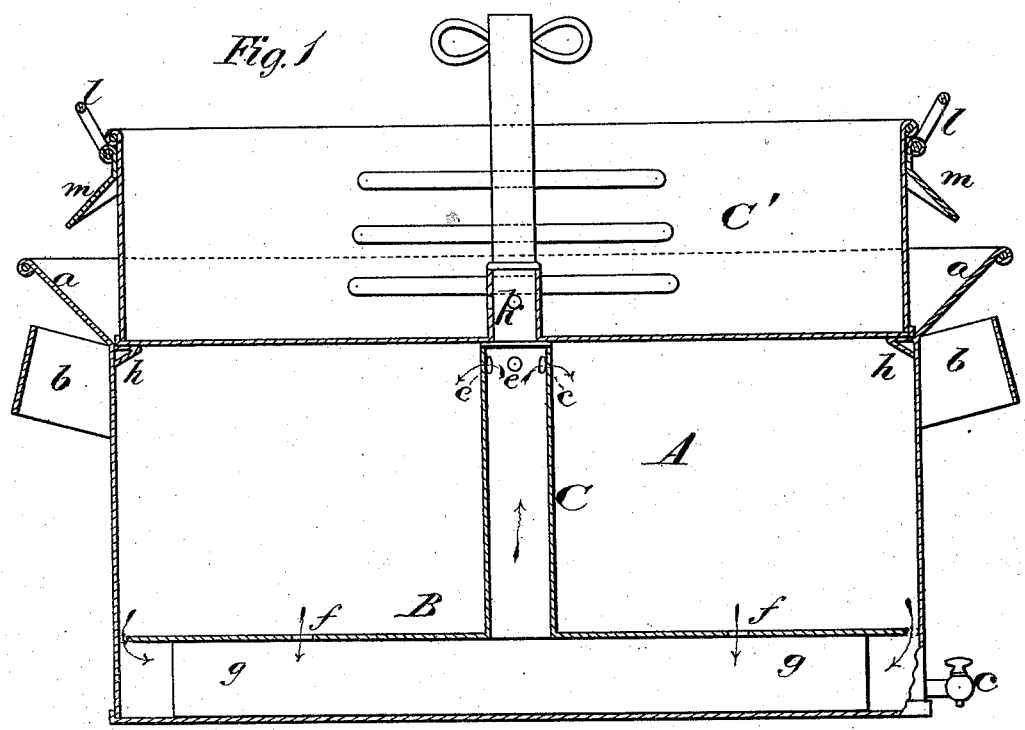
Figure 2:
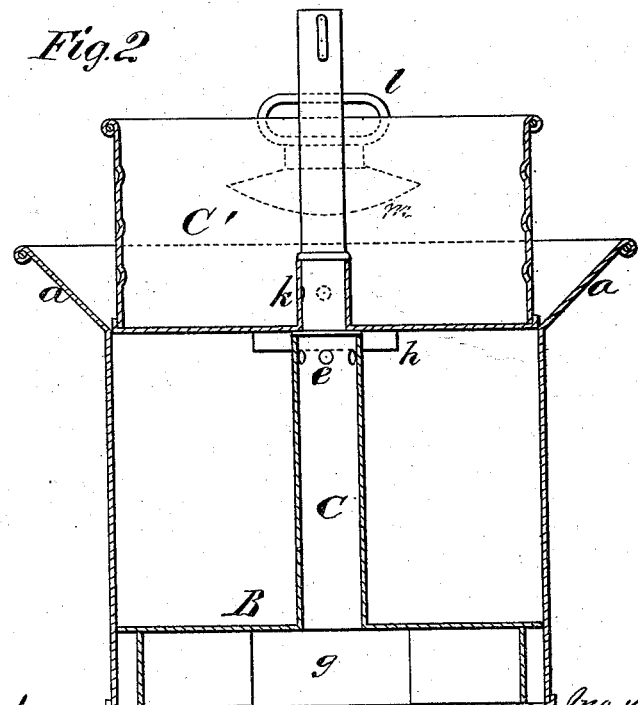

Figure 1 of the drawings is a representation of a longitudinal vertical section of my wash-boiler; and Fig. 2 is a transverse vertical sectional view thereof.

This invention has relation to boilers; and is intended as an improvement on the machine for which Letters Patent were granted to me dated May 6, 1873, No. 138,576, which are designed to cleanse the fabrics by means of boiling water elevated by means of steam-pressure, and discharged on top of the fabrics. The means pursued for accomplishing this object I will now describe.

In the annexed drawings, A designates the body of the boiler, which has a broad flaring rim, *a*, handles *b b*, and a draw-off cock, *c*, which latter is arranged as near as practicable to the bottom of the boiler, and is used for drawing off from time to time unclean water. B designates a removable inverted pan, from the center of which rises a tube, C, which is open at its top and bottom, and perforated at *e*. The rim of pan B is open at several points, and the top of this pan is perforated at *f f*. By theses means water is allowed to flow freely into the space *g* after descending through the fabrics. C' designates a removable pan, which rests upon ledges *h h*, and forms a cover for the boiler. In the center of the pan C' is a tubular valve, *k*, which, when it is opened, will allow cold water to flow down through tube C into the space *g*, the quantity of which water can be determined by gage-marks on the sides of the pan C'. At the ends of the pan C' are handles *l l*, and immediately below them are flanges *m m*, which will shield the hands from any steam which may rise from the boiler.

The hot water and steam rising through the tube C, and escaping from its upper end, will be suddenly cooled by contact with the bottom of the pan C', thus causing a very rapid circulation of the water in the boiler. When the water in the boiler becomes too unclean for use it is drawn off by cock *c*, and the required quantity of clean water is allowed to flow into space *g* from the pan C'.

The water in the boiler may be heated by steam from any well-known steam-generator, the boiler being placed in an opening in the top of the generator, or by any other convenient means, such as placing the boiler on top of a stove.

What I claim as new, and desire to secure by Letters Patent, is—

The pan B, having openings *f*, and provided with the pipe C open at its lower end and attached to its upper face, in combination with the water-feeding and steam-condensing pan C' and waste-water cock *c*, substantially as described, and for the purpose set forth.

In testimony that I claim the above I have hereunto subscribed my name in the presence of two witnesses.

JOHN R. PENDELL.

Witnesses:
R. JOHNSON, Jr.,
H. E. VAN DER VEER.